United States Patent [19]
Jönsson et al.

[11] Patent Number: 5,681,472
[45] Date of Patent: Oct. 28, 1997

[54] METHOD AND APPARATUS FOR SEPARATING GASEOUS BUBBLES AND SAND FROM A LIQUID FLOW

[75] Inventors: Kurt Jönsson, Nynäshamn; Magnus Hagrot, Saltsjö-Boo; Lennart Lenvik, Nynäshamn, all of Sweden

[73] Assignee: Nordic Water Products AB, Nynashamn, Sweden

[21] Appl. No.: 526,565

[22] PCT Filed: Jul. 9, 1992

[86] PCT No.: PCT/SE92/00517

§ 371 Date: Dec. 29, 1993

§ 102(e) Date: Dec. 29, 1993

[87] PCT Pub. No.: WO93/00977

PCT Pub. Date: Jan. 21, 1993

Related U.S. Application Data

[63] Continuation of Ser. No. 175,415, Dec. 29, 1993, abandoned.

[30] Foreign Application Priority Data

Jul. 12, 1991 [SE] Sweden ............................ 9102179

[51] Int. Cl.$^6$ .................................................. B01D 24/46
[52] U.S. Cl. ........................... 210/618; 210/794; 210/795; 210/274; 210/275; 210/189; 210/268; 210/270
[58] Field of Search ........................ 210/767, 786, 210/791, 189, 792, 794, 807, 801, 188, 197, 248, 269, 274, 275, 903, 793, 795, 616, 617, 618; 95/185, 186; 96/204

[56] References Cited

U.S. PATENT DOCUMENTS

| | | | |
|---|---|---|---|
| 3,480,542 | 11/1969 | Bucksteeg et al. | 210/786 |
| 4,060,484 | 11/1977 | Austin et al. | 210/786 |
| 4,126,546 | 11/1978 | Hjelmner et al. | 210/786 |
| 4,246,102 | 1/1981 | Hjelmner et al. | 210/786 |
| 4,720,347 | 1/1988 | Berne . | |
| 4,746,431 | 5/1988 | Gibaud et al. | 210/274 |
| 5,454,959 | 10/1995 | Stevens . | |
| 5,472,610 | 12/1995 | Jonsson . | |
| 5,520,804 | 5/1996 | Ward . | |
| 5,543,037 | 8/1996 | Hering, Jr. . | |
| 5,582,722 | 12/1996 | Wachinski et al. . | |

FOREIGN PATENT DOCUMENTS

| | | | |
|---|---|---|---|
| 0 356 870 | 3/1990 | European Pat. Off. . | |
| 1024107 | 3/1966 | United Kingdom | 210/786 |
| WO91/08818 | 6/1991 | WIPO . | |

OTHER PUBLICATIONS

Research Journal WPCF, vol. 62 (1990), No. 3, pp 239–245.

*Primary Examiner*—Robert Popovics
*Attorney, Agent, or Firm*—Jacobson, Price, Holman & Stern, PLLC

[57] ABSTRACT

A filtering process for and apparatus separating air bubbles and granular filter medium from a filtrate contaminated by the filter medium and bubbles when passing through a filter bed formed by the filter medium for treatment of a suspension or liquid solution, a gas being passed through the filter medium in contact therewith, includes providing a treated filtrate zone (3) above the filter bed (2), collecting the treated filtrate in the filtrate zone, conducting granular filter medium from the filter bed (2) upwardly through a conveying pipe (4) to a position above the filter bed and thereafter downwardly through a washing apparatus (5) from which the filter medium is precipitated onto a plate (11) above the filter bed. Treated filtrate flows through a separate chamber formed by a cylinder (12) around the washing apparatus (5) and then upwardly through the lower end of the washing apparatus and outwardly through the upper end of the washing apparatus and thereafter leaves the system through an overflow outlet pipe (7). The filtrate leaves the system through a separate filtrate outlet (8). The filtrate flowing downwardly through the separate chamber functions as the washing liquid and flows at a rate sufficiently low for separation of gas bubbles in the chamber therefrom. The filtrate washing liquid flowing upwardly through the washing apparatus (5) flows at a rate sufficiently low for separating the downwardly conducted granular filter medium.

6 Claims, 2 Drawing Sheets

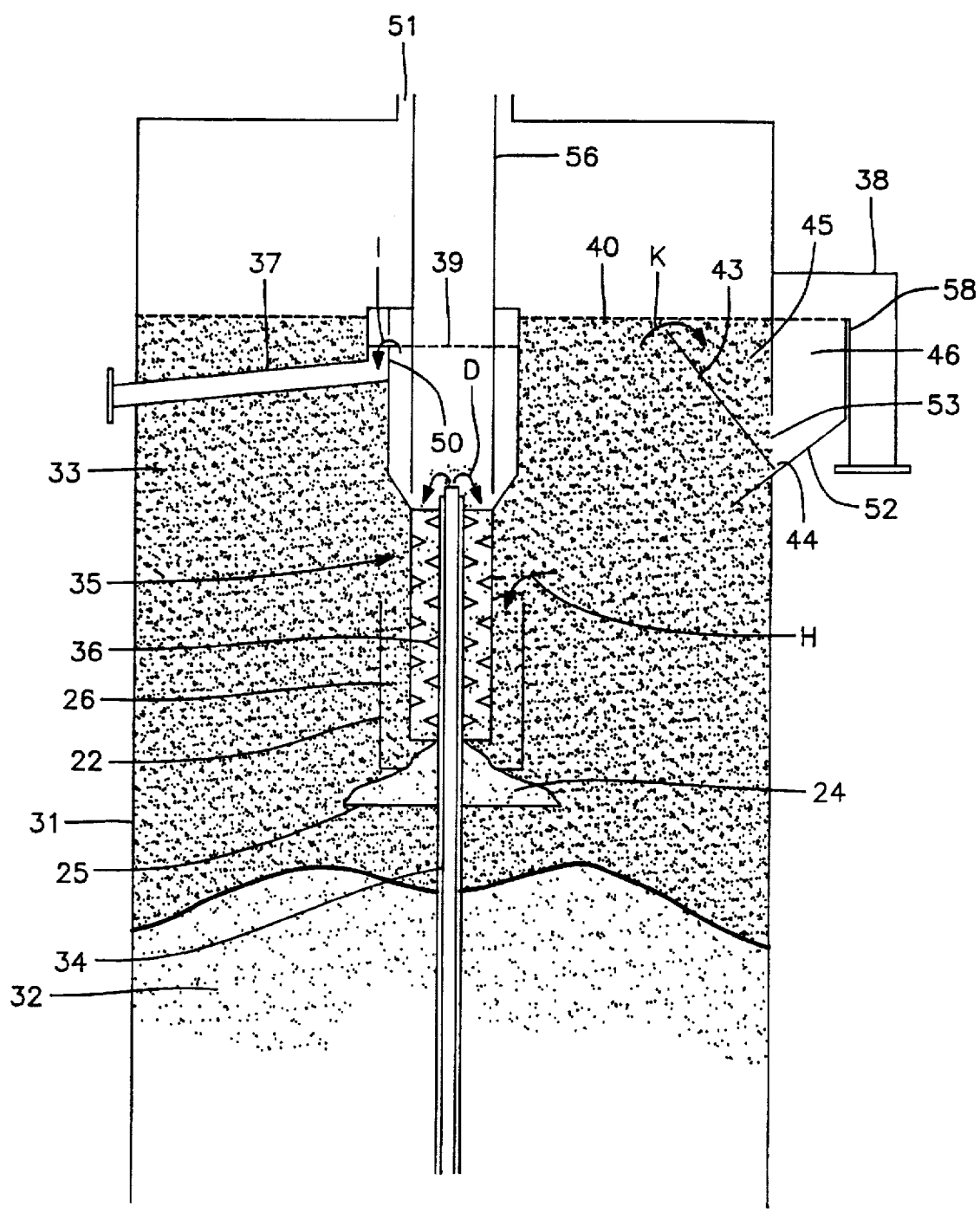

METHOD AND APPARATUS FOR SEPARATING GASEOUS BUBBLES AND SAND FROM A LIQUID FLOW

This application is a continuation of U.S. Ser. No. 08/175,415, filed Dec. 29, 1993, now abandoned.

BACKGROUND OF THE INVENTION

The present invention relates to a method and apparatus for preventing undesired sand spoilage from a filter bed in which air or other gas is used in contact with the filter medium. The invention is particularly usable in a continuously operating nitrification reactor for biological nitrogen reduction of a suspension or liquid solution.

From the Swedish Patent Specification No. 396 552 (corresponding to U.S. Pat. No. 4,126,546) it is known to perform filtration of a suspension or an emulsion in a filter bed of particulate filter medium by allowing the suspension to flow upwards through the filter bed simultaneously as the filter medium flows downwards through a filtration tank, wherein filtration takes place. Supply of suspension takes place in a lower part of the filter bed and the filtered liquid phase is taken from a zone above the filter bed. The polluted filter medium close to the bottom of the filtration tank is taken out for conveyance to a washing apparatus above the filter bed and after washing is returned to the upper surface of the filter bed. Such conveyance of the filter medium takes place most simply using a so-called mammoth or air lift pump, using air as a conveying medium.

It is also known to use a continuously operating granular filter bed for biological nitrogen reduction of a suspension or liquid solution, i.e. nitrification and denitrification. Bacterial strains suitable for the purpose are used in this case, and these strains are established in the filter bed. In the nitrification process, primarily ammonium compounds are oxidized to nitrates with the aid of oxygen, usually coming from air. Sand of a suitable grain size is preferably used as a filter medium. When the filter is used as a nitrification reactor, a relatively large air stream is blown into the lower part of the filter bed. However, the stream must be restricted to the order of magnitude which does not cause fluidizing of the filter bed. The uppermost layer of the filter sand is even so inevitably whirled up by air bubbles, cause the filtrate above the filter bed to be contaminated by sand. This whirling sand mixed with air bubbles causes some difficulty. In the first place the sand is entrained at the outlet for the filtrate, and in the second place air and sand penetrate from below into the washing apparatus for the sand, in the case where the washing apparatus is sunken into the filtrate zone. The washing function is thus blocked.

BRIEF SUMMARY OF THE INVENTION

The object of the present invention is to overcome these difficulties. In accordance with the invention, separation of air and sand from the liquid stream is achieved at the places where the difficulties are to be found, and this is done in the following manner. First of all the mixture of air and sand in the liquid is permitted to flow downwards at a rate sufficiently low for the majority of the air bubbles to be separated by rising upwards against the flow. The liquid is subsequently allowed to flow upwards at a rate sufficiently low for the sand not to be entrained in the upward flow but to separate downwards to the bed.

In the prior art apparatus illustrated in FIG. 1, similar to that of the above referred to U.S. Pat. No. 4,126,546, a particle filter medium 1 is enclosed in a tank having walls 2 and a funnel-shaped bottom 3. Sand is well adapted for use as the filter medium 1. The suspension or emulsion to be filtered is supplied, as shown by arrow A, to the tank through inlet 4 in the bottom portion of the tank as shown in FIG. 1 of the '546 patent, or alternatively as shown herein through pipe $4^1$. A roof 7 is arranged above the inlet, or each inlet pipe 6 as in the patent, in order to prevent the filter medium from blocking the inlet. The roofs 7 of the patent have a V-shaped cross section. The incoming suspension flows in counter-current to the filter medium. The filtrated and treated liquid phase obtained during the flow of the suspension upwards through the filter bed zone is kept in a collection zone 8 above the filter bed as a zone of filtrated liquid phase. The surface level of this filtrate is fixed by discharging from the filtration apparatus via a weir 9 to an outlet (arrow B).

In the tank bottom 3, down into which the dirty filter medium flows, the mount of a fitted hauling device 10, preferably a mammoth or air-lift pump, is located. The pump extends centrally through the apparatus. The air is supplied from above downwards through pipe 11 extending along a transport pipe 12 forming the hauling device. The air is supplied to the transport pipe 12 through holes 12' in the lower part of the pipe. The filter medium is transported upwardly (arrow C) by the air through the pipe 12 up to a wash device 13 positioned above the filter bed. A funnel 14 turned upside down is placed around the air-lift pump above the bottom mouth. The funnel catches air gone astray in the filter medium and discharges the caught air through holes in the top end of the funnel (not shown). The funnel also serves as guide means for the flow of the filter medium downwards, so that a uniform flow profile is obtained over the cross section of the apparatus.

The filter medium to be washed arriving from the upper end of the transport pipe 12, turns (arrow D) and flows downwards along a wash path 15 formed by the space between the transport pipe 12 and an outer, preferably concentric, pipe 16. Possible aggregates of he filter medium are broken up when they hit plates or the like 17 positioned in the flow path of the filter medium at the same time as the velocity of fall of the filter medium is decelerated. The filter medium flows counter-current to a wash liquid. The filtered liquid phase in zone 8 above the filter bed is used as wash liquid.

As shown in FIG. 1 the wash device is immersed in the filtrated liquid phase in zone 8 and the liquid phase is supplied to the wash path, as shown by arrows E, through the opening between he lower end of the outer pipe 16 and the hauling device 10 and flows upwards along the wash path. The wash liquid which becomes dirty during the washing, i.e. the reject, flows from the wash path as shown by arrow F over a weir 18, through an outlet pipe, and is discharged from the apparatus as shown by arrow G through an outlet. This weir can be adjustable as to its height and width position, thereby making it possible to control the quantity of wash liquid; e.g., lowering weir 18 increases the quantity of wash liquid. The quantity of wash liquid flowing along the wash path is thus controlled by adjustment of the difference of levels between the filtrate phase in zone 8 and the reject from the wash path.

In order to guide the filter medium, discharge from the transport pipe 12, downwardly to the wash path and in order to separate the reject from the filter medium, a pipe 19 is arranged between the outer pipe 16 and the transport pipe 12, the lower end of pipe 19 being lowered a distance below the top end of the transport pipe 12. Pipe 19 projects out of outer pipe 16 up to the space above the level of the filtrate in zone 8 permitting air from the air lift or transport pipe 12 to exhaust from the apparatus.

It is also known to use a continuously operating granular filter bed for biological reduction of a suspension or solution. In such cases air is blown into the filter bed through a suitable air inlet 20 extending around the air lift and through the filter bed.

BRIEF DESCRIPTION OF THE DRAWINGS

The invention will now be described in detail with reference to the accompanying drawing which drawings wherein:

FIG. 2 is a schematic cross-sectional view of the upper portion of an apparatus such as shown in FIG. 1, but incorporating the improvement of this invention.

FIG. 2 illustrates the upper part of a filter tank 31 containing a filter bed 32 of a granular filter medium, e.g. sand. A suspension or a liquid solution flows continuously through this filter bed from below and upwards for treatment as described above. The treated filtrate is collected in filtrate zone 33 above the filter bed. A transport pipe 34 extends through the filter bed from the lower part thereof close to the bottom and upwards such as to constitute a conveying means, e.g. a mammoth or air lift pump which operates in the same manner described above, for polluted sand to a washing device 35. The pipe 34 opens out above the washing device and the sand turns (arrow D) and flows down through washing path 36 between the pipe 34 and a pipe concentric and external thereto as described above. The sand moves downwards in this washing path and encounters an upward flow of the filtrate. The washing liquid or reject, polluted in this way flows out (arrow I) via a weir 50 to the discharge or outlet pipe 37. The filtrate is taken out at another overflow weir 58 to the outlet 38. These outlets, which are suitably regulatable, by raising and lowering as described above, to determine the level 39 of the washing liquid, and the level 40 of the filtrate which determines the amount of flow of washing liquid upwards in the washing path.

Figure 1:
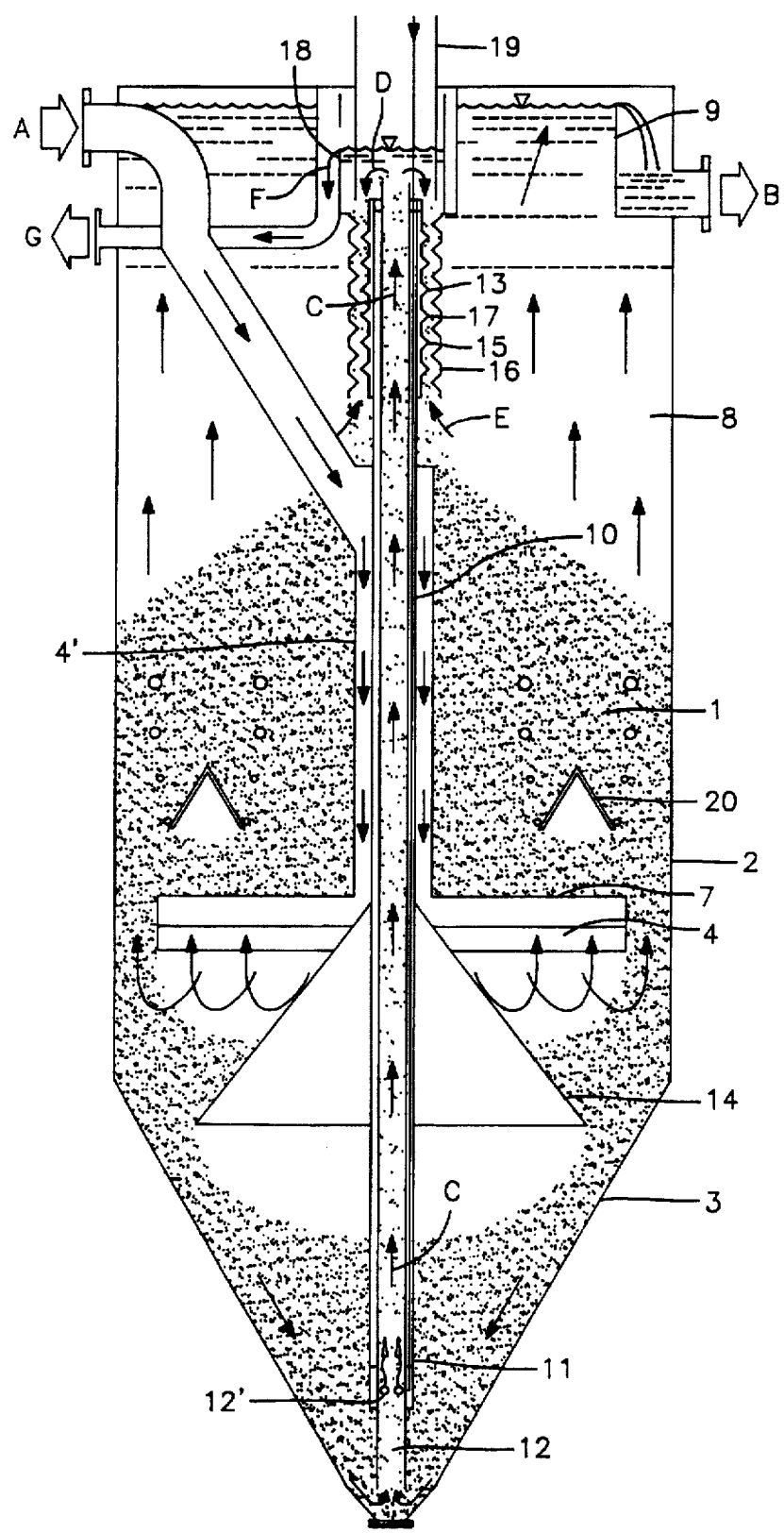
FIG. 1 is a schematic illustration of an apparatus for filtration of a suspension or emulsion, similar to that shown in U.S. Pat. No. 4,126,546.

When the sand bed is used as a nitrification reactor, air is blown in from below to the bed, and this air rises up through the bed together with the suspension or solution which is to be treated. The filtrate and air bubbles leave the sand bed at its upper surface. In this situation a sand layer several centimeters thick will be fluidized, and sand together with air bubbles will whirl about in practically the whole of the filtrate volume, i.e. zone 33. As previously mentioned, air bubbles could then penetrate into the washing path from below and block the washing process. In addition, sand would accompany the filtrate at the outlet 38 described hereafter.

In accordance with the invention, the filtrate containing air bubbles and sand is first caused to flow downwards for separating the air bubbles, and subsequently to flow upwards for separating sand. In the washing apparatus this can be achieved by means of a horizontal, preferably circular plate 11 under the washing apparatus 5 and at a distance from it such that the downwardly falling and sand from the washing path can form a sand cone having a natural angle of repose on the plate. A cylinder 12 is arranged concentrically around the washing path, and extends almost down to the sand cone on the plate 11. The liquid which is to constitute washing liquid in the washing path is thus compelled to flow downwards into the space or chamber 12a between the cylinder 12 and the washing apparatus, in the direction shown by arrow A. This space is given dimensions sufficiently large so that a flow rate is obtained which is low enough for the air bubbles to depart upwards in time before the liquid flow changes direction for entry into the washing path.

A method and device in accordance with the invention can also be provided at the filtrate outlet. Two mutually inclined plates 43, 44 each having an angle to the horizontal plane which is greater than the angle of repose for the sand are required for this purpose. The first, inner plate 43 extends from a level immediately below the filtrate level 40 and down to the outer plate 44, but leaves a gap 52 between the plates. The filtrate will now flow in on the upper side of the plate 43, as shown by arrow K, and is urged downwards by the filter tank shell to an opening 53 in the wall of the tank towards the outer plate 44, which is inclined in the opposite direction and up towards an outlet 38. The quieter flow conditions which occur here in the space 45 above the plate 43 allow departure of the air bubbles upwards above filtrate level 40 and out of the apparatus via opening 51. In the following outlet chamber 46 the flow is urged upwards at a rate sufficiently low so that the sand grains are separated by precipitation. They collect on the plate 44 and move back towards the filter bed through the gap 52 between both plates. This gap is dimensioned sufficiently large to pass a sand layer through, but not to include any air bubbles in the other direction. However, should some air bubbles come through the gap even so, they can rise up to the surface via the space 45 without disturbing sand separation in the outlet chamber 46.

In certain cases it may be necessary to decrease turbulence in space 45 and 46. This may be done by the aid of an insertion of a plurality of plates parallel to the plate 43 and/or plate 44. The centrifugal force which can occur when the water changes its flow direction from downwards to upwards is utilized here. Although the invention has only been described as applied to a continuously working nitrification reactor, it can also be used in a stationary filter bed and in other connections having similar problems.

We claim:

1. In a filtering process including separating means for separating gas bubbles and granular filter medium from a filtrate contaminated by said filter medium and bubbles when passing through a filter bed formed by the filter medium for treatment of a suspension or liquid solution, a gas being passed through the filter medium in contact therewith and said granular filter medium being conducted from said filter bed upwardly to a position above said filter bed and thereafter downwardly, the improvement comprising:

providing a filtrate collection space above said filter bed;
collecting said filtrate in said collection space;
providing a separate path above said filter bed for separate flow of filtrate from said collection space;
flowing said filtrate from said collection space substantially downwardly in said separate path at a rate sufficiently low for separation and upward flow of gas bubbles from said filtrate;
after flowing said filtrate through said separate path; flowing said filtrate upwardly through said downwardly conducted granular filter medium at a rate sufficiently low for separating said downwardly conducted granular filter medium from said filtrate, said filtrate continuing to flow upwardly thereafter to an outlet therefor; and
flowing said separated filtrate and gas bubbles from said collection space in separate exit paths.

2. The method as claimed in claim 1 and further comprising:

providing a washing apparatus in said collection space having an upper opening and a lower opening above said filter bed;

flowing said downwardly conducted granular filter medium through said upper opening of said washing apparatus, downwardly through said washing apparatus and outwardly through said lower opening of said washing apparatus; and flowing said upwardly flowing filtrate through said washing apparatus in counter-flowing relationship with said downwardly flowing granular filter medium therein.

3. The method as claimed in claim 1 for operation of a nitrification reactor, wherein:

air is blown into said filter bed of granular filter medium upwardly;

said filtrate flows downwardly in a separate path immediately prior to said outward flow thereof from said collection space; and thereafter said filtrate reverses direction and flows upwardly towards said separate exit path therefor.

4. In a filtering processor including separating means for separating gas bubbles and granular filter medium from a filtrate contaminated by said filter medium and bubbles when passing through a filter bed formed by the filter medium for treatment of a suspension or liquid solution, a gas being passed through the filter medium in contact therewith and said granular filter medium being conducted from said filter bed upwardly to a position above said filter bed and thereafter downwardly, the improvement comprising:

providing a filtrate collection space above said filter bed;

collecting said filtrate in said collection space;

providing a separate path above said filter bed for separate flow of filtrate from said collection space;

flowing said filtrate from said collection space substantially downwardly in said separate path at a rate sufficiently low for separation and upward flow of gas bubbles from said filtrate;

after flowing said filtrate through said separate path, flowing said filtrate upwardly at a rate sufficiently low for separating granular filter medium from said filtrate, said filtrate continuing to flow upwardly thereafter; and flowing said separated filtrate and gas bubbles from said collection space in separate exit paths.

5. The method as claimed in claim 4 and further comprising:

providing a wash device in said collection space having an upper opening and a lower opening above said filter bed;

flowing said downwardly conducted granular filter medium through an upper opening of said wash device, downwardly through said wash device and outwardly through a lower opening of said wash device; and flowing said upwardly flowing filtrate through said wash device in counter-flowing relationship with said downwardly flowing granular filter medium therein.

6. The method as claimed in claim 4 for operation of a nitrification reactor, wherein;

air is introduced into said filter bed of granular filter medium and flows upwardly.

* * * * *